(12) United States Patent
Yoshida

(10) Patent No.: US 8,090,882 B2
(45) Date of Patent: Jan. 3, 2012

(54) PROGRAM, CONTROL DEVICE AND CONTROL SYSTEM FOR DETERMINING A TERMINAL PERIPHERAL DEVICE

(75) Inventor: Akidi Yoshida, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 141 days.

(21) Appl. No.: 12/557,108

(22) Filed: Sep. 10, 2009

(65) Prior Publication Data

US 2010/0070657 A1     Mar. 18, 2010

(30) Foreign Application Priority Data

Sep. 12, 2008   (JP) ................................ 2008-234796

(51) Int. Cl.
G06F 3/00     (2006.01)
G06F 3/12     (2006.01)
(52) U.S. Cl. ............... 710/16; 358/1.15; 710/8; 710/10; 719/327
(58) Field of Classification Search .................. 358/1.1, 358/1.6, 1.15; 710/1, 8, 15, 16, 17, 19, 62; 719/321, 322, 327
See application file for complete search history.

(56) References Cited

U.S. PATENT DOCUMENTS

| 6,909,520 | B2 * | 6/2005 | Ogino | ........................ 358/1.15 |
| 7,236,262 | B2 | 6/2007 | Matsuo | |
| 2009/0064197 | A1 * | 3/2009 | Klyuchevsky | ................ 719/327 |

FOREIGN PATENT DOCUMENTS

JP     2002-91732     3/2002

* cited by examiner

Primary Examiner — Alford Kindred
Assistant Examiner — Richard B Franklin
(74) Attorney, Agent, or Firm — Scully, Scott, Murphy & Presser, PC

(57) ABSTRACT

In order to provide a system in which a single driver can totally control each periphery, there is provided a peripheral determination program executable on a main device installing the driver thereon. The peripheral determination program has a set of instructions including: acquiring device information assigned to each of a plurality of peripheral devices connected to the computer, the driver controlling operations of the plurality of peripheral devices, the device information indicating a model of each of the plurality of peripheral devices; extracting peripheral devices applicable to the driver out of the plurality of peripheral devices, the applicable peripheral devices being capable of executing all settings designated by the driver; selecting one peripheral device from the applicable peripheral devices; and determining the selected applicable peripheral device to be a terminal peripheral device.

14 Claims, 7 Drawing Sheets

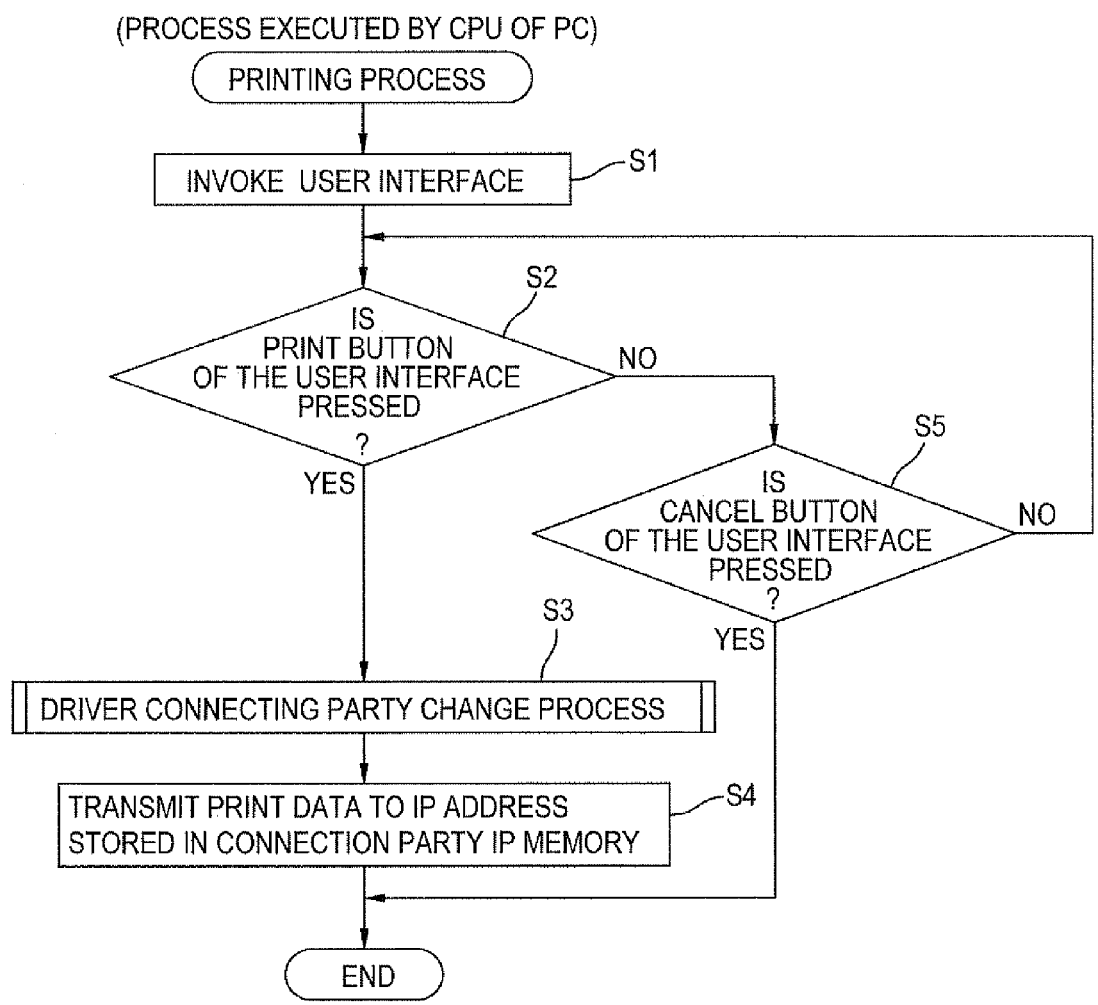

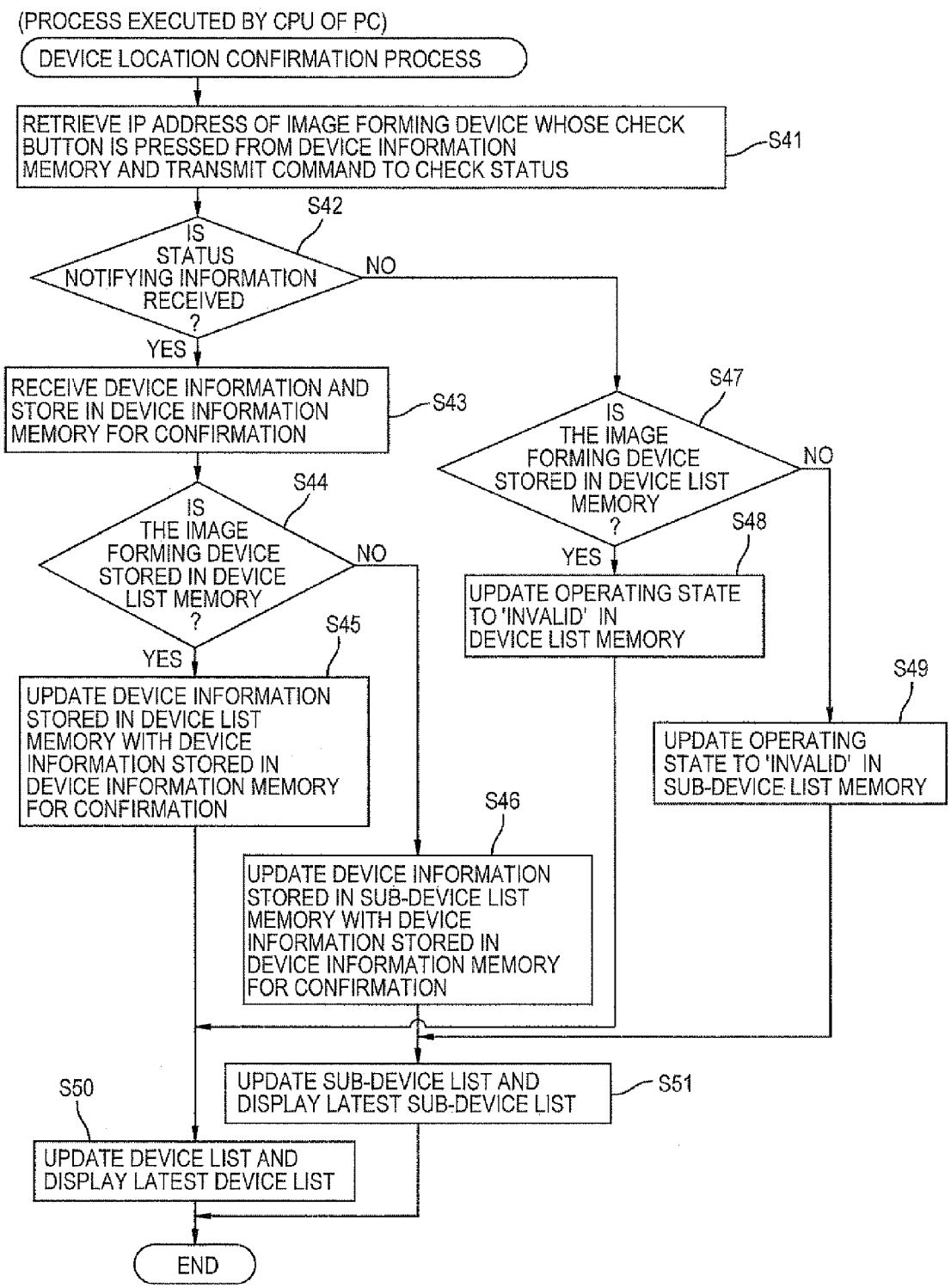

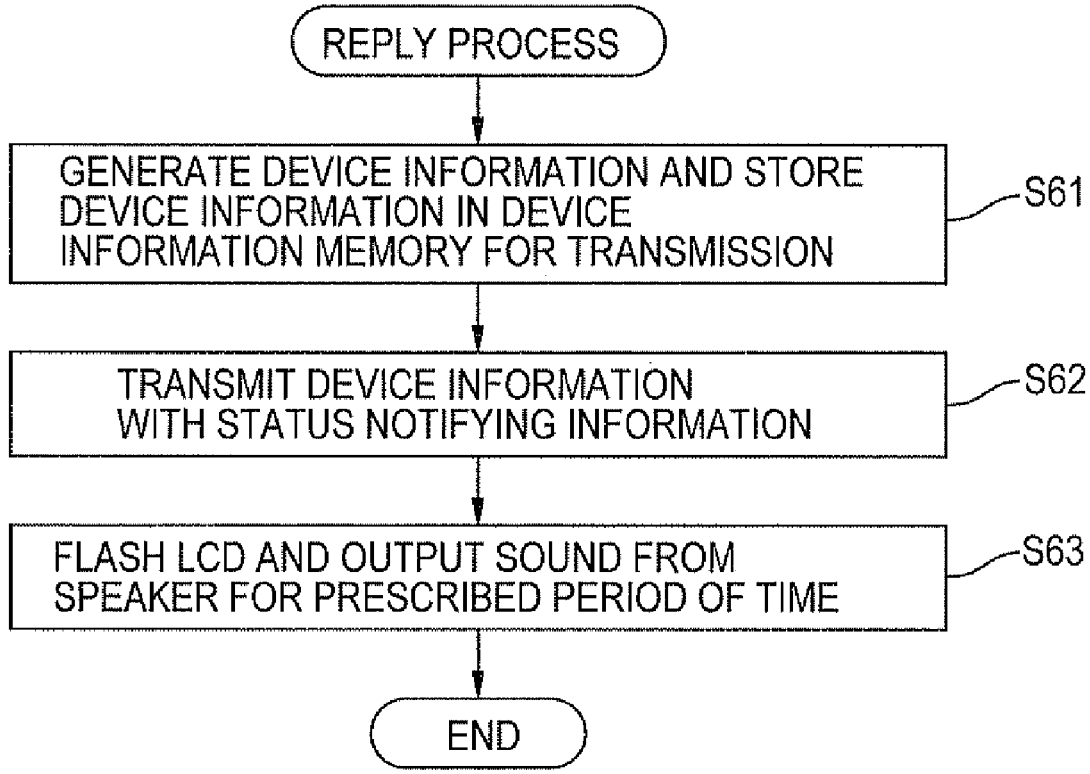

PROGRAM, CONTROL DEVICE AND CONTROL SYSTEM FOR DETERMINING A TERMINAL PERIPHERAL DEVICE

CROSS REFERENCE TO RELATED APPLICATION

This application claims priority from Japanese Patent Application No. 2008-234796 filed Sep. 12, 2008. The entire content of the priority application is incorporated herein by reference in its entirety.

TECHNICAL FIELD

The present invention relates to a peripheral determination program, a main control device and a control system.

BACKGROUND

Conventionally, a printer control system has been provided in which a single driver is installed on a main control device (a PC) for allowing a plurality of electrically-connected peripherals (printers) to be activated in order to effectively utilize an internal storage space of the main device. In such a printer system, the driver is configured to provide only basic settings (paper size or printing direction, for example) to the peripherals. However, since the driver is not allowed to set up configurations other than the basic settings, operations of the peripherals are therefore to be restricted.

SUMMARY

In view of the foregoing, it is an object of the present invention to provide a peripheral determination program, a main control device and a control system in which a single driver can control a plurality of peripherals without limiting operations of each peripheral device.

In order to achieve the above and other objects, there is provided a storage medium that stores a peripheral determination program executable on a computer installing a driver thereon. The peripheral determination program has a set of instructions including: acquiring device information assigned to each of a plurality of peripheral devices connected to the computer, the driver controlling operations of the plurality of peripheral devices, the device information indicating a model of each of the plurality of peripheral devices; extracting peripheral devices applicable to the driver out of the plurality of peripheral devices, the applicable peripheral devices being capable of executing all settings designated by the driver; selecting one peripheral device from the applicable peripheral devices; and determining the selected applicable peripheral device to be a terminal peripheral device.

According to another aspect of the present invention, there is provided a control device on which a peripheral determination program is executable. The control device has a driver thereon and the peripheral determination program includes a set of instructions including: acquiring device information assigned to each of a plurality of peripheral devices connected to the computer, the driver controlling operations of the plurality of peripheral devices, the device information indicating a model of each of the plurality of peripheral devices; extracting peripheral devices applicable to the driver out of the plurality of peripheral devices, the applicable peripheral devices being capable of executing all settings designated by the driver; selecting one peripheral device from the applicable peripheral devices; and determining the selected applicable peripheral device to be a terminal peripheral device.

According to further aspect of the present invention, there is provided a control system made including a control device and a plurality of peripheral devices connected to the control device. The control device has a driver and stores a peripheral determination program executable thereon. The peripheral determination program has a set of instructions including: acquiring device information assigned to each of a plurality of peripheral devices connected to the computer, the driver controlling operations of the plurality of peripheral devices, the device information indicating a model of each of the plurality of peripheral devices; extracting peripheral devices applicable to the driver out of the plurality of peripheral devices, the applicable peripheral devices being capable of executing all settings designated by the driver; selecting one peripheral device from the applicable peripheral devices; and determining the selected applicable peripheral device to be a terminal peripheral device.

BRIEF DESCRIPTION OF THE DRAWINGS

In the drawings:

FIG. 3 is a flowchart illustrating a printing process of the peripheral determination program executed by a CPU of the PC;

FIG. 5 is a flowchart illustrating a device location confirmation process executed by the CPU of the PC during the driver connecting party change process; and FIG. 6 is a flowchart illustrating a reply process executed by a CPU of an image forming device in response to the device location confirmation process.

DETAILED DESCRIPTION

Figure 1:
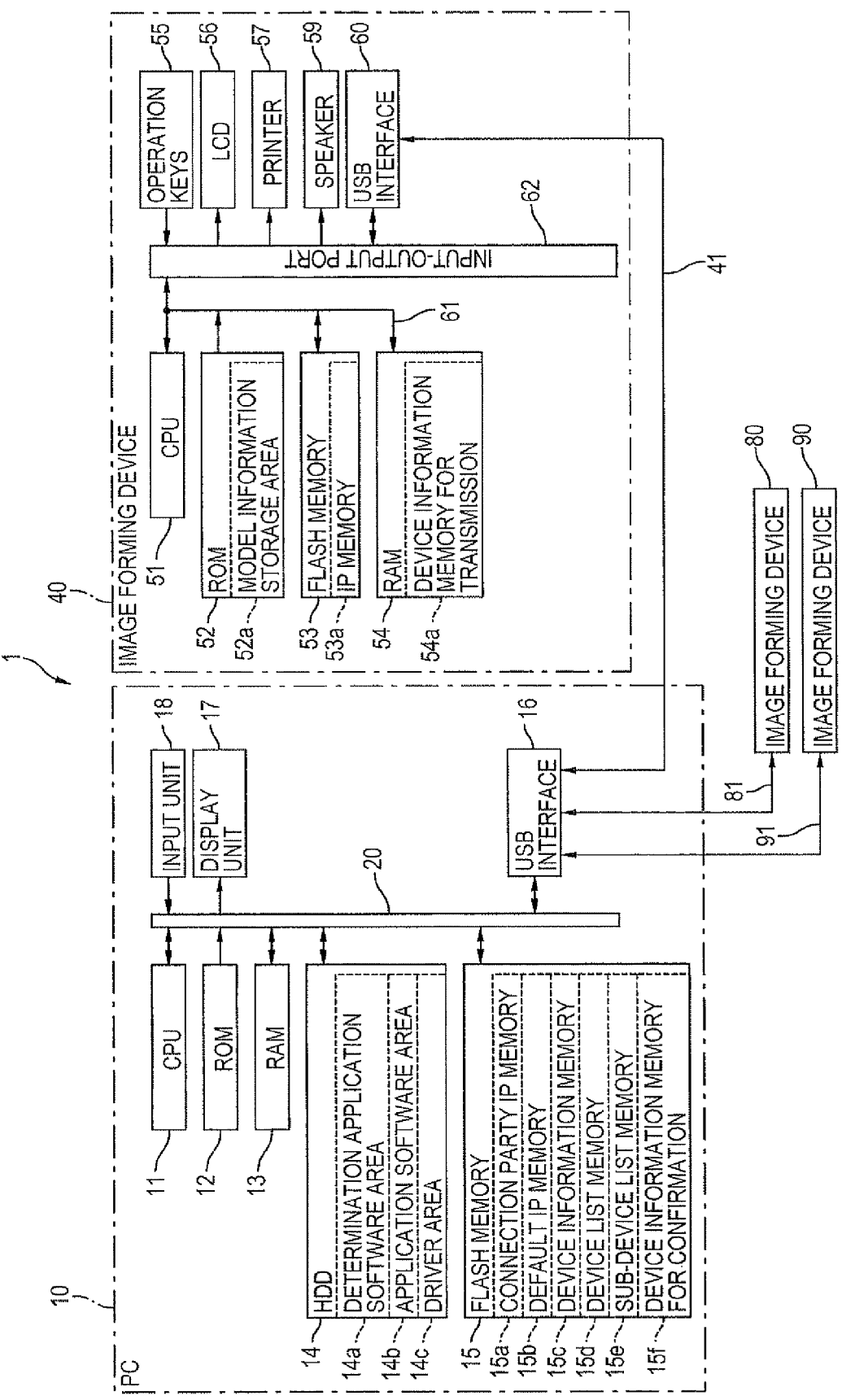
FIG. 1 is a block diagram illustrating an electrical configuration of an image forming system in which a PC installing a peripheral determination program according to an embodiment of the present invention is connected to a plurality of image forming devices.

First, an electric configuration of an image forming system 1 according to an embodiment of the present invention will be described with reference to FIG. 1. As shown in FIG. 1, the image forming system 1 includes a personal computer 10 (hereinafter to be referred to as a 'PC 10'), and three image forming devices 40, 80 and 90 as peripherals connected to the PC 10. Note that, although three image forming devices 40, 80 and 90 are included in the image forming system 1, only the image forming device 40 will be described for the sake of simplification.

The PC 10 is a main computer on which a periphery determination program according to the present embodiment is installed. The PC 10 generates print data (print information) including output color data, and outputs the same to the image forming device 40. The image forming device 40 is a tandem-type laser printer that forms images by transferring colors with drums corresponding to each color. The image forming device 40 receives the print data from the PC 10 and forms images based on the received print data.

As shown in FIG. 1, the PC 10 includes a CPU 11, a ROM 12, a RAM 13, an HDD 14, a flash memory 15, a USB interface 16, a display unit 17 and an input unit 18. These elements are connected to each other via a bus line 20.

The CPU 11 controls each of these elements, via the bus line 20, in accordance with fixed values and programs stored in the ROM 12, the RAM 13, the HDD 14, and the flash memory 15. The ROM 12 is a non-volatile read-only memory that stores programs such as a program for controlling operations of the PC 10. The RAM 13 is a volatile random-access memory that temporarily stores data necessary for processing of the CPU 11.

The HDD 14 has a determination application software area 14a, an application software area 14b and a driver area 14c. In the determination application software area 14a installed is a periphery determination application software that executes processes in flowcharts shown in FIGS. 3 to 5. Installed in the application software area 14b are various application softwares such as a word-processing software and a spreadsheet software. In the driver area 14c installed is a driver that can set up basic configurations of the peripherals (the image forming devices 40, 80 and 90 in the present embodiment) and can generate print data applicable to each image forming device. Note that, although a plurality of drivers can be installed on the driver area 14c, hereinafter only one driver adapted to the image forming device 40 (hereinafter referred to as a 'PC driver') is assumed to be installed on the driver area 14c in order to facilitate understanding of the present invention.

The flash memory 15 is a non-volatile random-access memory that temporarily stores data necessary for processing of the CPU 11. More specifically, the flash memory 15 includes a connection party IP memory 15a, a default IP memory 15b, a device information memory 15c, a device list memory 15d, a sub-device list memory 15e and a device information memory for confirmation 15f.

The connection party IP memory 15a stores an IP address of an image forming device designated by a user of the PC 10. The PC 10 outputs print data to the image forming device whose IP address is stored in the connection party IP memory 15a.

The default IP memory 15b stores an IP address assigned to an image forming device selected as a default image forming device by the user of the PC 10 (hereinafter to be referred to as a 'default device'). Note that, in the present embodiment, the image forming device 40 is assumed to be selected as the default device. That is, the default IP memory 15b stores IP address of the image forming device 40.

The device information memory 15c stores device information (will be described later) of each image forming device in association with corresponding image forming devices. The device list memory 15d and the sub-device list memory 15e store device information extracted from the device information stored in the device information memory 15c in association with corresponding image forming devices. More specifically, out of the device information stored in the device information memory 15c, the device list memory 15d stores device information of image forming devices determined to be capable of executing all the settings instructed from the PC driver, while the sub-device list memory 15e stores device information of image forming devices determined to be capable of executing only part of the settings instructed from the PC driver. Details on how to extract from the device information memory 15c will be described later.

The device information memory for confirmation 15f stores device information of an image forming device instructed to output a sound during a device location confirmation process (to be described later).

The USB interface 16 is connected to a USB interface 60 of the image forming device 40 via a USB cable 41. Note that, as illustrated in FIG. 1, the USB interface 16 is connected to the image forming device 80 via a USB cable 81, and to the image forming device 90 via a USB cable 91.

The display unit 17 includes a display screen 30 (see FIGS. 2A and 2B), and displays thereon contents of each process and inputted data visually. The display screen 30 may be a liquid crystal display or a CRT display. The input unit 18 inputs instructions of the user of the PC 10 and includes a keyboard or a mouse.

As also shown in FIG. 1, the image forming device 40 includes a CPU 51, a ROM 52, a flash memory 53 and a RAM 54. The CPU 51, the ROM 52, the flash memory 53 and the RAM 54 are connected to each other via a bus line 61 which is connected to an input-output port 62. The input-output port 62 is in turn connected to operation keys 55, an LCD 56, a printer 57, a speaker 59 and the USB interface 60.

The CPU 51 controls each element in the image forming device 40. The ROM 52 is a non-volatile memory that stores various control programs and data executed by the CPU 51. The ROM 52 has a model information storage area 52a in which a model name, a product ID and a series ID of the image forming device 40 are stored.

The flash memory 53 is also a non-volatile memory that stores information outputted from the PC 10. The flash memory 53 has an IP memory 53a that stores the IP address assigned to the image forming device 40.

The RAM 54 is a volatile memory that stores print data and control signals outputted from the PC 10. The RAM 54 has a device information memory for transmission 54a that stores device information to be transmitted to the PC 10.

The image forming device 40 generates device information thereof by combining the model name, the product ID and the series ID stored in the model information storage area 52a and the address stored in the IP memory 53a, when received a command to transmit the device information from the PC 10. The image forming device 40 then stores the generated device information in the device information memory for transmission 54a until the command requesting transmission of the device information is executed.

The operation keys 55 serve to input configurations and operations of the image forming device 40. The LCD 56 displays operating states and settings of the image forming device 40. The printer 57 is a tandem-type laser printer that forms images on recording medium by transferring colors with drums corresponding to each color. The speaker 59 outputs a sound in response to an instruction from the PC 10. The USB interface 60 is connected to the USB interface 16 of the PC 10 via the USB cable 41, as described earlier.

Next, with reference to FIGS. 2A and 2B, information stored in the device information memory 15c, the device list memory 15d and the sub-device list memory 15e of the PC 10 will be described in greater details.

Figure 2A:
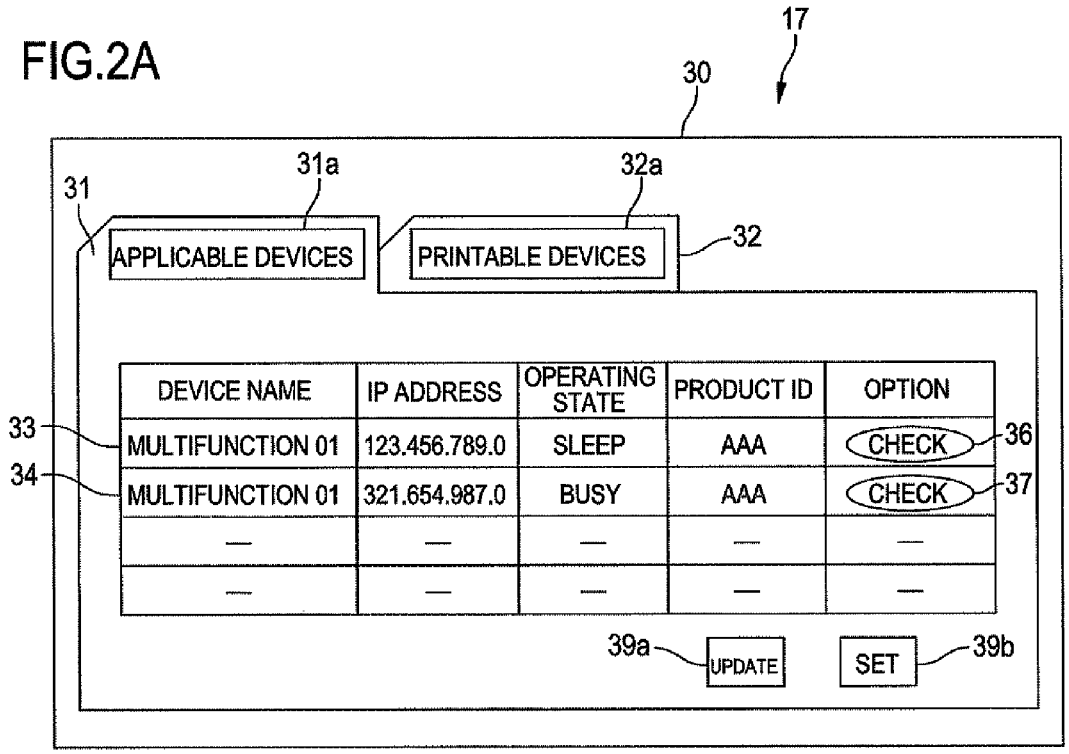
FIG. 2A is a view of a display screen of the PC schematically showing a state where a device list is displayed in fore-side of a sub-device list.
Figure 2B:
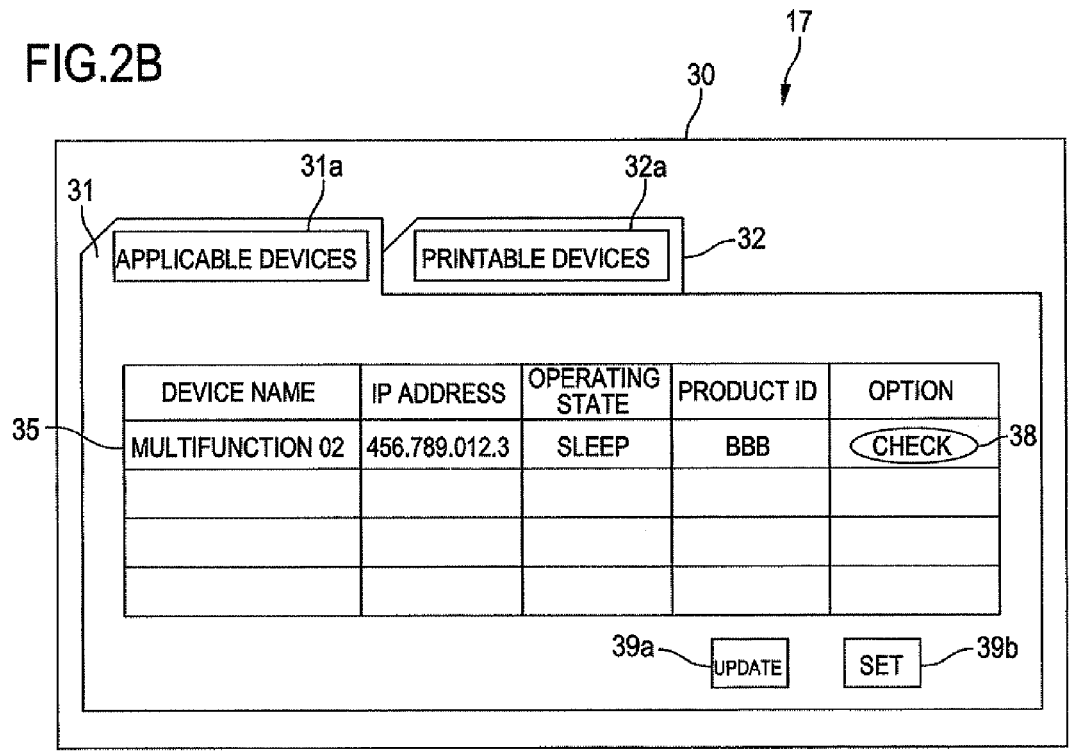
FIG. 2B is a view of the display screen of the PC schematically showing a state where the sub-device list is displayed in fore-side of the device list.

As shown in FIGS. 2A and 2B, on the display screen 30 of the display unit 17, either a device list 31 or a sub-device list 32 is configured to be displayed in fore-side of the other. The device list 31 is a list of image forming devices (and the device information thereof) stored in the device list memory 15d. The sub-device list 32 is a list of image forming devices (and the device information thereof) stored in the sub-device list memory 15e. In other words, the device list 31 shows image forming devices capable of executing all the settings instructed from the PC driver, while the sub-device list 32 shows image forming devices capable of executing only part of the settings instructed from the PC driver.

As shown in FIG. 2A, the device list 31 has a tab 31*a* which is labeled as "applicable devices." This label indicates that the listed image forming devices can execute all the settings instructed from the single PC driver. In contrast, as shown in FIG. 2B, the sub-device list 32 has a tab 32*a* which is labeled as "printable devices." This label shows that the listed image forming devices can execute only part of the settings (printing) instructed from the PC driver. Note that hereinafter the tab 31*a* will be referred to as a "device tab 31*a*", while the tab 32*a* will be referred to as a "sub-device tab 32*a*."

The device list 31 and the sub-device list 32 respectively include data groups, each configured of a set of data items for a listed image forming device. Specifically, the data items in the present embodiment include a device name identifying a name of the image forming device, an LP address assigned to the image forming device, an operating state of the image forming device, a product ID assigned to the model of the image forming device, and an option resulting in an output of a sound from the image forming device.

Of the data items shown in the device list 31, the device name, the IP address, the operating state and the product ID are stored in the device list memory 15*d*. In contrast, of the data items shown in the sub-device list 32, the device name, the IP address, the operating state and the product ID are stored in the sub-device list memory 15*e*.

Note that the device information stored in the device information memory 15*c* includes five data items as a set for each image forming device. That is, in addition to the device name, the IP address, the operating state and the product ID shown either in the device list 31 or in the sub-device list 32, each of the device information stored in the device information memory 15*c* further includes a series ID indicating a version of the image forming device.

The series ID is used to determine whether an image forming device should be categorized either in the device list 31 or in the sub-device list 32, or alternatively, whether an image forming device should be classified in neither of the device list 31 nor the sub-device list 32. The image forming devices determined to belong to either the device list 31 or the sub-device list 32 are given a series ID identical to each other. As a result, the series ID does not appear as a data item in the corresponding lists 31 and 32.

Note that, a product ID and a series ID are also assigned to the PC driver. As described before, only one driver applicable to the image forming device 40 is assumed to be installed on the PC 10 in the present embodiment. Therefore, an image forming device whose product ID and series ID are both identical to those of the PC driver is to be shown in the device list 31 as an image forming device capable of executing all the configurations designated by the PC driver. On the other hand, an image forming device whose product ID is different from that of the PC driver, although having the same series ID as that of the PC driver, is to be listed in the sub-device list 32 as an image forming device capable of executing only a part of the configurations designated by the PC driver.

In contrast, if image forming devices are determined not to be classified in the both lists 31 and 32, i.e., if an image forming device has a series ID different from the PC driver's series ID, such image forming device cannot execute any operations instructed by the PC driver, thereby resulting in disappearance in both the device list 31 and the sub-device list 32.

As apparent from FIG. 2A, the product ID assigned to the PC driver applicable to the image forming device 40 is "AAA." Note that a data group 33 indicates the image forming device 40 and a data group 34 indicates the image forming device 80.

According to the data group 33, the image forming device 40 has a device name "multifunction 01", an IP address "123.456.789.0", an operating state "sleep", and a product ID "AAA." Note that, an operating state "sleep" indicates that an image forming device is on stand-by, i.e., the image forming device is ready for immediately performing a printing operation upon receipt of print data. Alternatively, "busy" may be shown in the operating state. This operating state "busy" means that an image forming device has been in a process of printing received data, i.e., this image forming device cannot perform a printing operation immediately after receiving print data.

In the data item 'option', a check button 36 is provided. If the user of the PC 10 presses this check button 36, the image forming device 40 is configured to output a sound. With this sound outputted from the image forming device 40, the user is notified of a location of the image forming device 40.

Likewise, the data group 34 indicates a device name, an IP address, an operating state, a product ID of the image forming device 80 as shown in FIG. 2A. If a check button 37 is depressed, the image forming device 80 will output a sound.

The device list 31 and the sub-device list 32 are provided with an update button 39*a* and a set button 39*b*. In response to depression of the update button 39*a*, the PC 10 acquires the device information from the image forming devices 40, 80 and 90, and updates each data item shown in the device list 31 and the sub-device list 32. When the set button 39*b* is depressed after, for example, the device name "multifunction 01" of the data group 34 is pressed, the image forming device 80 is to be selected as an image forming device to which the PC 10 transmits print data. At this time, the IP address of the image forming device 80 "321.654.987.0" is stored in the connection party IP memory 15*a*.

At the state of FIG. 2A, if the sub-device tab 32*a* is selected with an operation of the input unit 18 (for example, by clicking the sub-device tab 32*a* with a mouse), the state will switch to a state shown in FIG. 2B.

A data group 35 represents the image forming device 90. The data group 35 indicates that the image forming device 90 has a device name "multifunction 02", an IP address "456.789.012.3", an operating state "sleep" and a product ID "BBB." When a check button 38 is depressed by the user, the image forming device 90 is configured to output a sound as a response. When the set button 39*b* is depressed after the device name "multifunction 02" of the data group 35 is pressed, the image forming device 90 is to be selected as an image forming device to which the PC 10 transmits print data. At this time, the IP address of the image forming device 90 "456.789.012.3" is stored in the connection party IP memory 15*a*.

In this way, an image forming device to which the PC 10 outputs print data can be selected from the device list 31 and the sub-device list 32. Further, both of the device list 31 and the sub-device list 32 indicate operating states of each image forming device. Therefore, the user of the PC 10 can select an appropriate image forming device to output print data while referring to operating states of each image forming device. When an image forming device listed on the device list 31 (the image forming device 40 or the image forming device 80 in the present embodiment) is selected as a destination, the selected image forming device can execute all the settings designated by the PC driver installed on the PC 10, thereby realizing an image forming system in which a single driver of a PC can have a total control over peripherals without limiting operations of the peripherals.

Next, a printing process executed by the CPU 11 according to the peripheral determination application software stored in the determination application software area 14a will be described with reference to FIG. 3.

The user of the PC 10 first launches the peripheral determination application software. After the user initiates an application stored in the application software area 14b and instructs the application to print, the CPU 11 starts executing the printing process shown in FIG. 3 via the PC driver.

Referring to a flowchart of FIG. 3, upon receipt of a print command from the user, the CPU 11 invokes a user interface of the PC driver, which is shown on the display screen 30 of the display unit 17 (S1). Note that the user interface is a set-up screen where the user can determine: a print range, a paper size, a number of sets to be printed, transmission of print data and cancellation of a printing operation.

The CPU 11 then determines whether or not a print button provided on the user interface is pressed (S2). If the print button is determined not to have been depressed (S2:No), the CPU 11 then determines whether a cancel button provided on the user interface is pressed (S5). If the cancel button is not pressed (S5: No), the CPU 11 returns to S2. If the cancel button is pressed (S5:Yes), the CPU 11 terminates the printing process.

On the other hand, if the CPU 11 determines that the print button has been pressed (S2:Yes), the CPU 11 executes a driver connecting party change process (S3). Through the driver connecting party change process, an image forming device to which the PC 10 outputs print data is to be selected as a print data destination, and an IP address of the selected image forming device is stored in the connection party IP memory 15a. In response to the storage of the IP address in the connection party IP memory 15a, the CPU 11 transmits the print data to the IP address (S4) and ends the printing process.

Figure 4A:
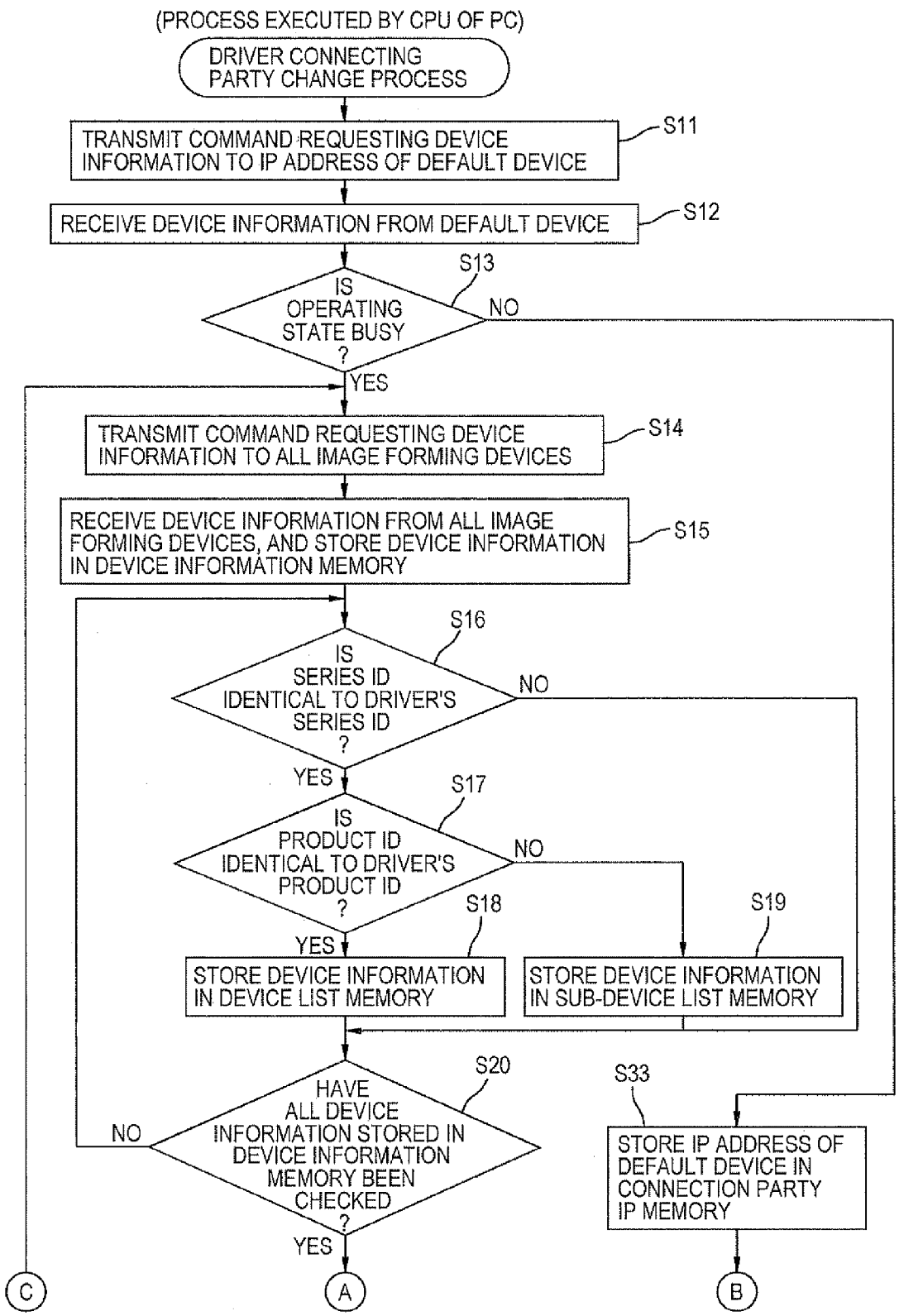
FIGS. 4A and 4B are a flowchart illustrating a driver connecting party change process executed by the CPU of the PC during the printing process.
Figure 4B:
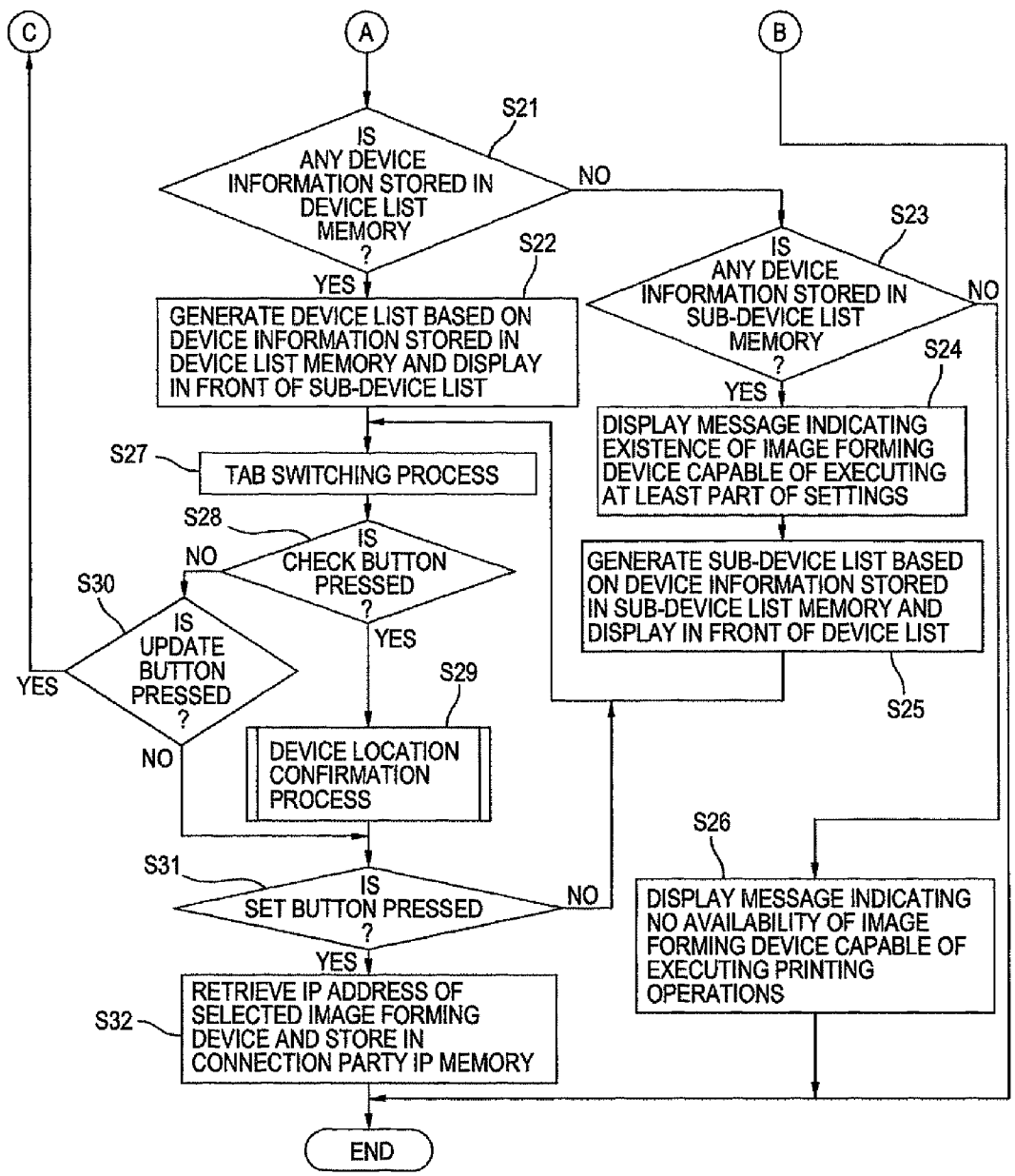

Next, the driver connecting party change process (executed by the CPU 11 at S3 in FIG. 3) will be described in details with reference to a flowchart of FIGS. 4A and 4B.

When the print command is determined to be executed, the CPU 11 first transmits a command asking for device information of the default device (the image forming device 40 in the present embodiment), to the IP address of the default device, in the form of Unicast (S11). Upon receipt of this command, the default device (the image forming device 40) transmits device information thereof to the PC 10. The CPU 11 receives the device information transmitted from the default device (S12).

The CPU 11 then checks if the operating state of the default device is busy (S13). If the operating state of the default device is not busy (S13:No), the operating state is sleep, meaning that the default device is ready to print at any time. Hence, the CPU 11 stores the IP address of the default device stored in the default IP memory 15b in the connection party IP memory 15a (S33) and ends the driver connecting party change process. As a result, the image forming device to which the PC 10 outputs the print data is determined to be the default device, i.e., the image forming device 40.

With this configuration, the operating state of the default device is first to be determined before checking the status of other peripheries (the image forming devices 80 and 90), thereby allowing the default device to immediately execute printing operations, ahead of other peripherals, whenever possible.

If the CPU 11 determines that the operating state of the default device is busy (S13:Yes), meaning the default device is currently executing another printing operation, the default device cannot be used immediately for printing. Therefore, the CPU 11 executes steps after S14 in order to select another image forming device as a print data destination.

The CPU 11 transmits a command requesting device information to all image forming devices connected to the PC 10 in the form of Broadcast (S14). As a response, each of the image forming devices received this command is configured to transmit device information thereof to the PC 10.

The CPU 11 receives the device information from all the image forming devices connected thereto, and stores the transmitted device information in the device information memory 15c in association with corresponding image forming devices (S15). The CPU 11 then determines whether each of the series IDs stored in the device information memory 15c is identical to the series ID assigned to the PC driver (S16).

If a series ID of an image forming device (the image forming device 80, for example) stored in the device information memory 15c matches the series ID of the PC driver (S16:Yes), the CPU 11 then determines whether the product ID of the image forming device 80 is identical to the product ID of the PC driver (S17). If the product ID of the image forming device 80 is determined to be the same as the product ID of the PC driver (S17:Yes), the device information of the image forming device 80 is configured to be stored in the device list memory 15d (S18). Alternatively, if a product ID of an image forming device (the image forming device 90, for example) is determined to be different from the product ID of the PC driver (S17:No), the device information of the image forming device 90 is configured to be stored in the sub-device list memory 15e (S19).

In this way, during the flows from S17 to either S18 or S19, image forming devices connected to the PC 10 are sorted into two categories, according to the device information stored in the device information memory 15c: image forming devices capable of executing all the setting designated by the PC driver (stored in the device list memory 15d) and image forming devices capable of executing only part of the settings designated by the PC driver (stored in the sub-device list memory 15e).

Note that if, at S16, a series ID of an image forming device stored in the device information memory 15c is determined to be different from the series ID of the PC driver (S16:No), this image forming device can not execute any of the settings designated by the PC driver. Hence, for such image forming devices, the CPU 11 skips steps from S17 to S19.

Subsequently, the CPU 11 determines whether all of the device information stored in the device information memory 15c have been checked (S20). If there remains any image forming device whose device information has not been checked yet (S20:No), the CPU 11 returns to S16.

If the CPU 11 determines that all the device information have finished being checked (S20:Yes), the CPU 11 then determines whether any device information has been stored in the device list memory 15d (S21). If device information is determined to be stored in the device list memory 15d (S21: Yes), the CPU 11 generates the device list 31 based on the device information stored in the device list memory 15d and display the same on the display screen 30 in fore-side of the sub-device list 32, as shown in FIG. 2A (S22).

If the CPU 11 determines that nothing is stored in the device list memory 15d (S21:No), the CPU 11 then determines whether there is any device information stored in the sub-device list memory 15e (S23). If there exists device information stored in the sub-device list memory 15e (S23:Yes), the CPU 11 displays a message, on the display screen 30, saying that there exists an image forming device capable of executing at least part of the configurations designated by the PC driver (S234). The CPU 11 then generates the sub-device list 32 based on the device information stored in the sub-device list memory 15e and displays the same in fore-side of the device list 31 on the display screen 30, as shown in FIG. 2B (S25).

Note that, if the CPU 11 determines that no device information has been stored in the sub-device list memory 15e (S23:No), the CPU 11 displays a message indicating that no image forming device is available for executing printing operations (S26). The CPU 11 then terminates the driver connecting party change process.

Once either the device list 31 or the sub-device list 32 is displayed on the display screen 30 at S22 or 825, the CPU 11 proceeds to a tab switching process (S27). The tab switching process refers to switching display of the display screen 30 between the device list 31 and the sub-device list 32 in accordance with inputs from the input unit 18, as described earlier with reference to FIGS. 2A and 2B.

If nothing is input from the input unit 18 at S27, when device information is stored in the device list memory 15d (S21:Yes), the device list 31 is shown in fore-side of the sub-device list 32 on the display screen 30, as shown in FIG. 2A. In other words, the sub-device list 32 is allowed to be visible on the display screen 30 only if the sub-device tab 32a is selected with the input unit 18, i.e., the tab switching process has been executed, this way, when there exists any image forming device capable of executing all the settings instructed from the PC driver, image forming devices listed in the device list 31 are to be displayed, and therefore to be selected by the user, prior to image forming devices shown in the sub-device list 32.

Once the tab switching process ends (S27), the CPU 11 then determines whether any of the check buttons (see FIGS. 2A and 2B) is pressed (S28). If no check button is determined to have been pressed (S28:No), the CPU 11 then determines whether the update button 39a is pressed (S30). If the update button 39a is determined to have been pressed (S30:Yes), the CPU 11 returns to S14 in order to update all the device information shown in the device list 31 and the sub-device list 32. If the update button 39a is not pressed (S30:No), the CPU 11 proceeds to S31.

If any of the check buttons is determined to have been pressed (S28:Yes), the CPU 11 proceeds to a device location confirmation process (S29). Through the device location confirmation process, the CPU 11 identifies a location of an image forming device whose check button has been pressed at S28, acquires latest device information thereof, and updates the device list 31 or the sub-device list 32 including the selected image forming device. Details of the device location confirmation process will be described later.

Once the device location confirmation process has been executed (S29) or the update button 39a is determined not to have been pressed (S30:No), the CPU 11 determines whether the set button 39b has been pressed, i.e., whether one image forming device is selected as a data destination to which the PC 10 outputs the print data (S31). If the set button 39b has not been pressed yet (S31:No), the CPU 11 returns to the tab switching process at S27. If the set button 39b is determined to have been pressed (S31:Yes), the CPU 11 retrieves an IP address of the selected image forming device from the device information memory 15c and stores the IP address in the connection party IP memory 15a (S32). In this way, an image forming device to which the PC 10 outputs the print data is determined. The driver connecting party change process is then terminated.

The device location confirmation process will now be described with reference to a flowchart of FIG. 5.

First, the CPU 11 retrieves an IP address of an image forming device whose check button has been pressed at S28 of the driver connecting party change process from the device information memory 15c, to the selected image forming device, a command requesting to check the operating status thereof (S41). Upon receipt of the status check command, the recipient image forming device transmits the device information thereof together with status notifying information to the PC 10. The status notifying information indicates that the image forming device has received the status check command. At the same time, the recipient image forming device flashes the LCD 56 or outputs a sound for a predetermined period of time (about one minute, for example). This process (a reply process) executed at the image forming device side will be described later.

The CPU 11 then determines whether the status notifying information has been received from the target image forming device (S42). If the status notifying information is determined to have been received (S32:Yes), the CPU 11 then receives the device information transmitted simultaneously with the status notifying information from the corresponding image forming device, and stores the same in the device information memory for confirmation 15f (S43).

The CPU 11 then determines whether the image forming device whose check button has been pressed is stored in the device list memory 15d (S44). If the target image forming device is stored in the device list memory 15d (S44:Yes), the device information of the target image forming device stored therein is replaced (updated) with the device information stored in the device information memory for confirmation 15f (S45).

If the target image forming device is determined not to be stored in the device list memory 15d (S44:No), the device information of the target image forming device stored in the sub-device list memory 15e is replaced (updated) with the device information stored in the device information memory for confirmation 15f.

If no status notifying information is received (S42: No), the image forming device whose check button has been pressed could be in a state where no power is supplied thereto, or in a state where communications with the PC 10 has failed. Hence, in order to reflect the latest operating state, the CPU 11 then determines whether this image forming device is stored in the device list memory 15d (S47).

If the image forming device is stored in the device list memory 15d (S47:Yes), the CPU 11 updates the operating state corresponding to this image forming device to 'invalid' in the device list memory 15d (S48). Alternatively, if the applicable image forming device is not stored in the device list memory 15d (S47:No), the CPU 11 updates the operating state corresponding to this image forming device to 'invalid' in the sub-device list memory 15e (S49). Note that, an image forming device whose operating state has been set to 'invalid' at S47 or S48 is not allowed to be selected from the device list 31 or the sub-device list 32.

After the device information stored in the device list memory 15d has been updated at either S45 or S48, the CPU 11 updates the device list 31 in accordance with the updated device information and displays the latest device list 31 on the display screen 30 (S50). Alternatively, when the device information stored in the sub-device list memory 15e has been updated at either S46 or S49, the CPU 11 updates the sub-device list 32 based on the updated device information and displays the latest sub-device list 32 on the display screen 30 (S51). In this way, the device list 31 and the sub-device list 32 are configured to be updated with the latest device information.

As above described, the device location confirmation process results in identifying a location of an image forming device to which the PC 10 is planning to output the print data, as well as in confirming a latest operating state of the target image forming device.

Finally, a reply process executed at the peripherals (the image forming devices 40, 80 and 90 in the present embodiment) will be described with reference to a flowchart of FIG. 6. The reply process is configured to be executed, by a CPU of a peripheral image forming device whose check button has been pressed, in response to the status check command transmitted thereto from the PC 10 (at S41 of the device location confirmation process).

In response to the status check command transmitted from the CPU 11 of the PC 10 (S41 of FIG. 5), the CPU of the image forming device combines the model name, the product ID and the series ID stored in the model information storage area 52*a* and the IP address stored in the IP memory 53*a* to generate the device information thereof, and stores the generated device information in the device information memory for transmission 54*a* (S61).

The CPU of the image forming device then transmits the device information to the PC 10 together with the status notifying information (S62). The status notifying information indicates that the image forming device has received the status check command transmitted from the PC 10, as described earlier. Subsequently, the CPU controls the LCD 56 to flash and instructs the speaker 59 to output a sound for a prescribed period of time (for one minute, for example), informing the user of the PC 10 of the location of the image forming device (S63). The CPU of the image forming device then terminates the reply process.

In this way, in the reply process, the image forming device transmits the device information thereof and the status notifying information to the PC 10, while identifying the location of the image forming device to the user of the PC 10 through the LCD 56 and the speaker 59.

With the above-described configuration, in the image forming system 1 according to the present embodiment, the user of the PC 10 can select one image forming device to which the print data is to be outputted among the image forming devices shown in the device list 31, i.e., image forming devices capable of executing all the configurations designated by the PC driver. Hence, a single driver installed in a PC (the PC driver) can have control over image forming devices connected thereto (the image forming devices 40 and 80) without limiting operations of the image forming devices.

Further, the driver connecting party change process is configured to be executed when a print command is executed, i.e., when an application software instructs the PC driver to print. Accordingly, the device list 31 and the sub-device list 32 can be generated based on the latest operating states of the image forming devices, thereby enabling the user of the PC 10 to select an image forming device as a print data destination, among all the connected image forming devices, based on the latest information. Moreover, the user of the PC 10 can select such an image forming device in a series of the printing process.

Further, in the driver connecting party change process, whether the image forming devices 40, 80 and 90 connected to the PC 10 can execute all the all the settings designated by the PC driver is determined based on whether the product ID and the series ID assigned to each image forming device is identical to those assigned to the PC driver. Hence, whether each image forming device should be stored in the device list memory 15*d* or in the sub-device list memory 15*e* can be reliably determined.

Further, in the driver connecting party change process, a command requesting device information is transmitted to the peripheries in the Broadcast form, which takes relatively more time than the Unicast form, only if the default device is determined not to be able to execute printing operations immediately. That is, the default device is configured to be the first to be selected, as long as the default device is ready for printing immediately. Hence, a time period until a printing operation is executed can be made shorter, regardless of the operating state of the default device, compared to a case where all commands are transmitted in the Broadcast format.

While the present invention has been described in detail with reference to the specific embodiment thereof, it would be apparent to those skilled in the art that various changes and modifications may be made therein without departing from the spirit of the invention.

For example, in the image forming system 1 according to the present embodiment, the printing process is to be executed when a print command is transmitted to the PC driver from an application software, and the driver connecting party change process is configured to be executed during the printing process (S3 of FIG. 3). However, the driver connecting party change process may be configured to be launched automatically when the peripheral determination application software stored in the determination application software area 14*a* is initiated by the user of the PC 10. In this case, one image forming device is to be determined before the user instructs the driver to execute printing.

Further, if the user displays the property of the PC driver with the built-in OS functions and switches the pre-determined default device to another image forming device, the CPU 11 may be configured to skip S11-S13 and start from S14 in the driver connecting party change process. With this configuration, upon instruction of switching the default device, the CPU 11 can reliably updates the device list 31 and the sub-device list 32 irrespective of the operating state of the default device. Hence, the user can reliably select a connecting party (an image forming device as a print data destination) based on the updated information.

Further, instead of transmitting a command to each image forming device in the Broadcast faun at S14 to obtain the device information in the driver connecting party change process, the CPU 11 may be configured to transmit a command to request only the operating state of each image forming device in the Broadcast form. This is because the operating state is assumed to change most frequently in the device information. In this case, the CPU 11 may only update the operating state for each image forming device stored in the device information memory 15*c*. With this configuration, the amount of information transmitted from each image forming device can be reduced, leading to shorter processing time at S15 in the driver connecting party change process.

In the present embodiment, the driver connecting party change process is configured to be executed when the print button provided in the user interface is pressed during the printing process. However, the driver connecting party change process may be configured to be launched after the user interface pops up. In this case, once the driver connecting party change process has ended, the CPU 11 determines whether the print button has been pressed (S2 of FIG. 3) and then determine whether the cancel button has been pressed (S5 of FIG. 3). With such a configuration, the user can determine an image forming device to which the print data is outputted from the PC 10 before confirming the print data.

As a further variation, if an application software installed in the PC 10 is initiated and instructs the PC driver to print without invoking the user interface, the CPU 11 may be configured to execute S3-S4, while skipping S1-S2 and S5, in the printing process shown in FIG. 3. With this configuration, the user can determine an image forming device to output the print data from the PC 10 in the driver connecting party change process, even if the PC driver transmits a print command without using the user interface.

Further, the image forming system 1 may be configured of peripherals other than image forming devices. In other words, the PC driver of the PC 10 may control operations of peripherals such as a scanning device and a multifunctional device electrically connected to the PC 10. In this case as well, the image forming system 1 ensures that the single PC driver installed in the PC 10 can control each peripheral without limiting operations thereof.

While each of the image forming devices 40, 80 and 90 is electrically connected to the PC 10 via the USB cables 41, 81 and 91 in the present embodiment, each image forming device may be provided with a wireless communication interface for electrically connecting each of the image forming devices to the PC 10.

What is claimed is:

1. A storage medium that stores a peripheral determination program executable on a computer installing a driver thereon, the peripheral determination program including a set of instructions comprising:
   acquiring device information assigned to each of a plurality of peripheral devices connected to the computer, the driver controlling operations of the plurality of peripheral devices, the device information indicating a model of each of the plurality of peripheral devices;
   extracting peripheral devices applicable to the driver out of the plurality of peripheral devices, the applicable peripheral devices being capable of executing all settings designated by the driver;
   selecting one peripheral device from the applicable peripheral devices; and
   determining the selected applicable peripheral device to be a terminal peripheral device wherein;
   the applicable peripheral devices are extracted each time the device information is acquired, and one of the applicable peripheral devices is selected as the terminal peripheral device each time the applicable peripheral devices are extracted.

2. The storage medium as claimed in claim 1, wherein the device information is also assigned to the driver; and
   extracting the applicable peripheral devices is executed based on whether the device information of each peripheral device is identical to the device information of the driver.

3. A storage medium that stores a peripheral determination program executable on a computer installing a driver thereon, the peripheral determination program including a set of instructions comprising:
   acquiring device information assigned to each of a plurality of peripheral devices connected to the computer, the driver controlling operations of the plurality of peripheral devices, the device information indicating a model of each of the plurality of peripheral devices;
   extracting peripheral devices applicable to the driver out of the plurality of peripheral devices, the applicable peripheral devices being capable of executing all settings designated by the driver;
   selecting one peripheral device from the applicable peripheral devices; and
   determining the selected applicable peripheral device to be a terminal peripheral device, wherein;
   the driver predesignates one of the peripheral devices as a main peripheral device;
   extracting the applicable peripheral devices is cancelled if the operation information of the main peripheral device acquired in execution of the acquiring instruction indicates that the main peripheral device can immediately execute an operation instructed by the driver; and
   the main peripheral device is determined as the terminal device if execution of the extracting instruction is cancelled and wherein;
   each of the plurality of peripheral devices outputs operation information indicative of operating state thereof;
   the operation information is acquired in addition to the device information in execution of the acquiring instruction; and
   the extracted applicable peripheral devices are displayed on a display unit along with the operation information thereof.

4. The storage medium as claimed in claim 3, the set of instructions further comprising detecting that the main peripheral device is changed to another peripheral device without activating the driver by an application software installed on the computer;
   wherein the device information and the operation information are obtained in execution of the acquiring instruction when the main peripheral device is detected to have been changed;
   the applicable peripheral devices are extracted each time the device information and the operation information are obtained; and
   one of the applicable peripheral devices is selected each time the applicable peripheral devices are extracted.

5. The storage medium as claimed in claim 3, wherein only the main peripheral device transmits the device information and the operation information thereof in execution of the acquiring instruction.

6. The storage medium as claimed in claim 5, wherein all of the plurality of peripheral devices transmits the device information and the operation information thereof when the operation information of the main peripheral device indicates that the main peripheral device cannot execute an operation instructed by the driver immediately.

7. A storage medium that stores a peripheral determination program executable on a computer installing a driver thereon, the peripheral determination program including a set of instructions comprising:
   acquiring device information assigned to each of a plurality of peripheral devices connected to the computer, the driver controlling operations of the plurality of peripheral devices, the device information indicating a model of each of the plurality of peripheral devices;
   extracting devices applicable to the driver out of the plurality of peripheral devices, the applicable peripheral devices being capable of executing all settings designated by the driver;
   selecting one peripheral device from the applicable peripheral devices; and
   determining the selected applicable peripheral device to be a terminal peripheral device,
   wherein assistant peripheral devices are further extracted from the plurality of peripheral devices based on the acquired device information, the assistant peripheral devices being capable of partially executing settings designated by the driver; and
   the assistant peripheral devices and the operation information thereof are displayed on the display unit along with the applicable peripheral devices and the operation information thereof and wherein;

each of the plurality of peripheral devices outputs operation information indicative of operating state thereof;

the operation information is acquired in addition to the device information in execution of the acquiring instruction; and the extracted applicable peripheral devices are displayed on a display unit along with the operation information thereof.

8. The storage medium as claimed in claim 7, wherein the applicable peripheral devices and the operation information thereof are displayed in fore-side of the assistant peripheral devices and the operation information thereof.

9. The storage medium as claimed in claim 8; wherein the applicable peripheral devices and the assistant peripheral devices are able to be alternately displayed on the display unit in fore-side of each other in association with the corresponding operation information.

10. The storage medium as claimed in claim 7, wherein version information is further assigned to each of the plurality of peripheral devices in addition to the device information, the version information indicating a version of each of the plurality of peripheral devices, the version information being also assigned to the driver;

the version information is acquired in addition to the device information; and extracting the assistant peripheral devices is executed based on whether the device information of each peripheral device is not identical to the device information of the driver but the version information of each peripheral device is identical to the version information of the driver.

11. The storage medium as claimed in claim 7, wherein the plurality of peripheral devices is able to output a notification message; and the set of instructions further comprising:

accepting a peripheral device that is chosen to output the notification message from the applicable peripheral devices and the assistant peripheral devices; and transmitting another command to output the notification message to the chosen peripheral device.

12. The storage medium as claimed in claim 11, wherein the peripheral device chosen to output the notification message is again requested to transmit the operation information thereof to the driver when outputting the notification message; and the operation information displayed on the display unit is updated in accordance with the operation information transmitted from the peripheral device that outputted the notification message.

13. A control device on which a peripheral determination program is executable, the control device having a driver thereon, the peripheral determination program including a set of instructions comprising:

acquiring device information assigned to each of a plurality of peripheral devices connected to the computer, the driver controlling operations of the plurality of peripheral devices, the device information indicating a model of each of the plurality of peripheral devices;

extracting peripheral devices applicable to the driver out of the plurality of peripheral devices, the applicable peripheral devices being capable of executing all settings designated by the driver;

selecting one peripheral device from the applicable peripheral devices; and determining the selected applicable peripheral device to be a terminal peripheral device wherein;

the applicable peripheral devices are extracted each time the device information is acquired, and one of the applicable peripheral devices is selected as the terminal peripheral device each time the applicable peripheral devices are extracted.

14. A control system comprising a control device and a plurality of peripheral devices connected to the control device, the control device having a driver and storing a peripheral determination program executable thereon, the peripheral determination program including a set of instructions comprising:

acquiring device information assigned to each of a plurality of peripheral devices connected to the computer, the driver controlling operations of the plurality of peripheral devices, the device information indicating a model of each of the plurality of peripheral devices;

extracting peripheral devices applicable to the driver out of the plurality of peripheral devices, the applicable peripheral devices being capable of executing all settings designated by the driver;

selecting one peripheral device from the applicable peripheral devices; and determining the selected applicable peripheral device to be a terminal peripheral device wherein;

the applicable peripheral devices are extracted each time the device information is acquired, and one of the applicable peripheral devices is selected as the terminal peripheral device each time the applicable peripheral devices are extracted.

* * * * *